United States Patent [19]

Bastiaans

[11] 3,851,840

[45] Dec. 3, 1974

[54] HIGH SPEED CARTRIDGE

[75] Inventor: Cedric R. Bastiaans, Verona, Pa.

[73] Assignee: Westinghouse Electric Corporation, Pittsburgh, Pa.

[22] Filed: May 18, 1972

[21] Appl. No.: 254,693

[52] U.S. Cl. .................................. 242/198, 242/192

[51] Int. Cl. ............................................ G11b 23/10

[58] Field of Search ........... 242/198, 199, 200, 192, 274/4 B, 4 C

[56] References Cited

UNITED STATES PATENTS

| | | | |
|---|---|---|---|
| 3,075,717 | 1/1963 | Kingston | 242/200 |
| 3,143,270 | 8/1964 | Cohen | 242/76 X |
| 3,497,157 | 2/1970 | Hanes et al. | 242/192 X |
| 3,520,495 | 7/1970 | Sotani | 242/192 |
| 3,523,657 | 8/1970 | Hearon, Jr. et al. | 242/200 |
| 3,524,651 | 8/1970 | Ketzer | 242/198 X |
| 3,547,446 | 12/1970 | Kern | 274/4 C |
| 3,575,421 | 4/1971 | Kato | 274/4 B |
| 3,593,946 | 7/1971 | Shardlow | 242/192 |
| 3,600,071 | 8/1971 | Downey | 242/199 |
| 3,667,701 | 6/1972 | Blum | 242/192 |

FOREIGN PATENTS OR APPLICATIONS

| | | | |
|---|---|---|---|
| 1,112,551 | 5/1968 | Great Britain | 242/192 |
| 1,170,581 | 11/1969 | Great Britain | 242/198 |
| 2,062,916 | 7/1971 | Germany | 242/199 |

*Primary Examiner*—George F. Mautz
*Attorney, Agent, or Firm*—M. P. Lynch

[57] ABSTRACT

A reel-to-reel magnetic tape cartridge for a high speed tape dubbing system capable of achieving tape speeds as high as 240 inches per second or higher and characterized in that the tape is driven by a capstan, while payoff and take-up reels are braked and driven, respectively, by peripheral engagement with spring-loaded rollers. Cutaway corners of the cartridge casing facilitate peripheral engagement of the reels with driving and braking rollers, respectively. The tape is engaged and driven between an external capstan and an idler roller carried within the cartridge housing intermediate the tape reels. An additional feature of the invention resides in the provision of a novel reel brake which automatically engages the peripheries of the reels to stop them and prevent accidental rotation when the cartridge is ejected from a tape deck.

2 Claims, 4 Drawing Figures

HIGH SPEED CARTRIDGE

BACKGROUND OF THE INVENTION

While not limited thereto, the present invention is particularly adapted for use in audio-tutorial tape systems used to provide individualized instruction in educational institutions and the like. In its simplest form, a system of this type comprises a number of prerecorded tapes which may be checked out in the school library and played back in carrels, set up in the library. These tapes are pre-recorded by the instructor for the course and are prepared as supplemental information to reinforce homework assignments, lectures, new techniques and the like. One particular advantage of the audiotutorial system is that it provides frequent, independent and repetitious tutoring to a student without requiring the time of the instructor.

The simplest embodiment as described above, however, has severe limitations. Each time a tape is checked out by a student, it stays out for as long as the student needs it which, with all of the time required to repeat several portions of it, will be very much longer than its real-time playback of about 30 minutes. During this time, of course, the tape in question is not available to other students. The provision of multiple copies of each tape is one way of solving the problem. However, this creates a high inventory problem aside from the problem of projecting the extent of the demand for any one tape.

A way of eliminating the problem or reducing it to an extremely small magnitude is to provide the student with his own, personal copy of the desired tape, for instance a tape cassette, which he could then utilize to the fullest extent without hampering his student colleagues. In this respect, the desired program can be dubbed (i.e., re-recorded) onto the student's personal tape cassette at a high rate of speed. The student is then free to play the cassette at his convenience, either in his personal cassette playback unit or in one of the carrels located in a school library. Furthermore, a system of this sort allows the student to collect an entire set of tutorial tapes for any course that he takes, and which he can play back at any time. The only time a program is not available to a student is when it is being used to dub some other student's cassette. Of course, it is of prime importance that the time required for dubbing be kept to a minimum. In this respect, it is desirable to provide a system wherein a 1-hour program, for example, requires no more than about 30 seconds to dub. This, however, requires tape speeds as high as 240 inches per second or higher. While several types of tape cartridges are available, none of these allows a tape speed higher than about 15 inches per second. Consequently, such conventional tape cartridges cannot be used in a system, such as that described above, wherein the entire contents of a storage tape can be transferred to a cassette in a very short time interval.

It will be appreciated, of course, that another application for high speed dubbing is in the sale of musical recordings on tape cassettes. Presently, it is necessary for each store to carry a large inventory of cassettes on which are recorded various musical performances. By using a master tape cartridge for each recording, and by dubbing this at high speed onto a blank cassette, it is necessary to maintain in inventory only the one master cartridge for each separate performance and a number of blank cassettes each of which can be used to receive any recording from any master cartridge.

SUMMARY OF THE INVENTION

In accordance with the present invention, a reel-to-reel magnetic tape cartridge is provided capable of achieving tape speeds as high as 240 inches per second or higher, such that it may be used in a high speed dubbing system wherein a 1-hour program on a master tape, for example, can be transferred to a cassette in as little as 30 seconds.

Specifically, there is provided a magnetic tape cartridge comprising a casing of upper and lower mating halves, a pair of spaced reels within the casing, a plurality of tape guides within the casing, and a magnetic tape extending from one of the reels around the guides to the other of the reels. Two corners of the casing are cut away to expose peripheral portions of the reels for engagement, respectively, with a driving wheel and a hold-back device, at least a portion of the side wall of the casing between said cut-away portions being open to receive a magnetic pickup head across which the tape will pass and a driving capstan for the tape. An idler roller is carried within the casing on the side of the tape opposite the capstan such that the tape will peripherally engage both the capstan and the idler roller which is resiliently mounted within the cartridge.

With this arrangement, the tape is driven accurately at a desired high speed while the take-up and pay-off reels are driven and braked, respectively, by frictional engagement of their peripheries with springloaded rollers. The system is such that once the cartridge is inserted into a playing deck and the capstan rotated, the entire tape will be transferred from the payoff to the take-up reel. The leader at the trailing end of the tape is sensed by a photocell or the like; and this acts to automatically eject the cartridge from the playing deck at the completion of a dubbing operation.

Due to the extremely high speeds employed, the tape reels in the cartridge, after ejection, will normally continue to rotate at a high speed, possibly causing breakage or fouling of the tape. Therefore, in accordance with another aspect of the invention, a reel brake is provided which automatically engages the peripheries of the two tape reels and stops them as soon as the cartridge is ejected from the playing deck. The guides around which the tape travels in passing from one reel to the other are preferably comprised of rollers of the hourglass or concave type in order that the concave configuration will automatically center the tape at high speeds and prevent it from moving or weaving back and fourth axially along the rollers.

The above and other objects and features of the invention will become apparent from the following detailed description taken in connection with the accompanying drawings which illustrate an embodiment of the invention, and wherein.

Figure 1:
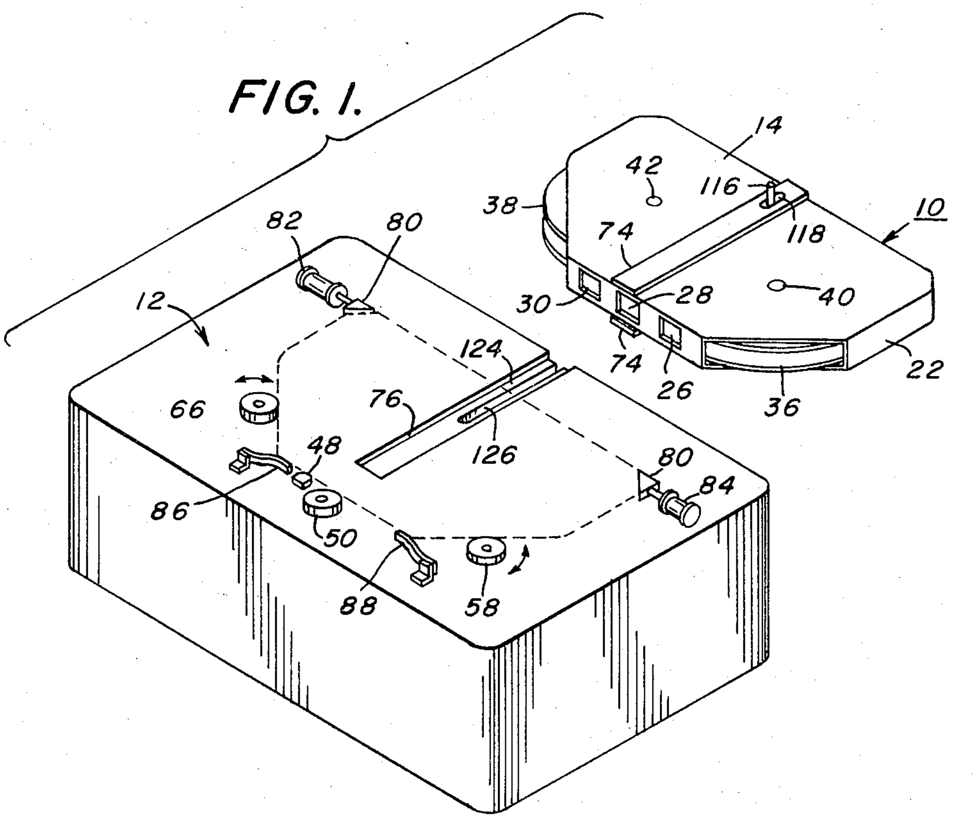
FIG. 1 is a perspective view of the cartridge of the invention and a typical playing deck with which it may be used, showing the manner in which the cartridge is received on the playing deck.
Figure 2:
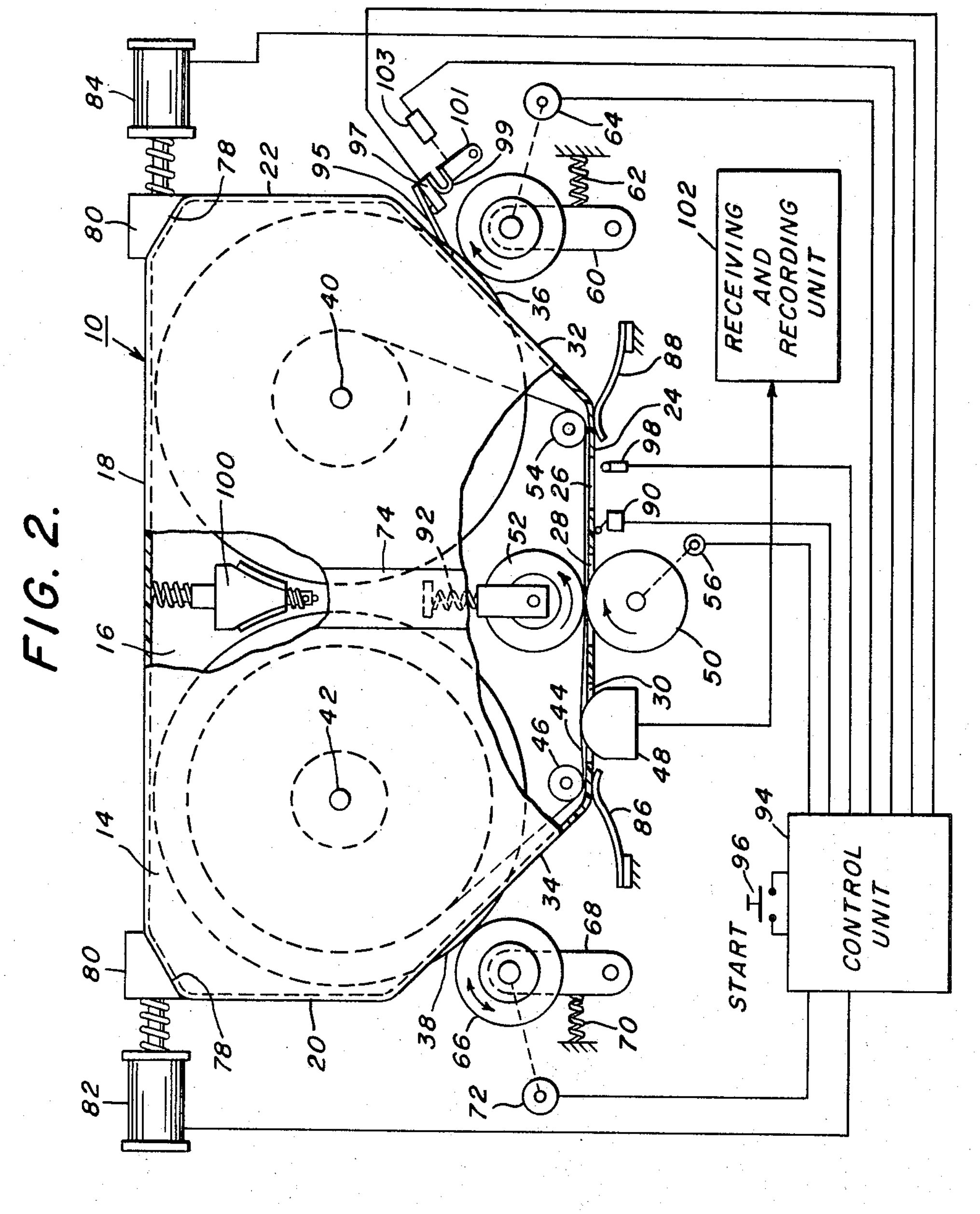
FIG. 2 is a top view of the cartridge of the invention in combination with associated electrical controls for controlling the tape drive and the cartridge ejecting mechanism.

With reference now to the drawings, and particularly to FIGS. 1 and 2, there is shown a tape cartridge, generally indicated by the reference numeral 10, adapted to be received on a playing deck 12. With specific reference to FIG. 2, the cartridge 10, which is preferably formed in upper and lower mating halves, comprising an upper plate 14, a lower plate 16, a back wall portion 18, two side wall portions 20 and 22 and a front wall portion 24 provided with three openings 26, 28 and 30. In the normal manufacture of the cartridge, the upper and lower plates 14 and 16 will be integrally formed with upper and lower halves of the side walls which are then joined together along a seam.

Between the side wall 22 and the front wall 24 is a cut-away portion 32. Similarly, a cut-away portion 34 is provided between the front wall 24 and side wall 20. Projecting out through the cut-away portions 32 and 34 are the peripheries of two tape reels 36 and 38 mounted for rotation about pins 40 and 42, respectively, extending between the top and bottom plates 14 and 16. The tape reels 36 and 38 are free to rotate on the pins 40 and 42 in the absence of any force applied to their peripheries. That is, these reels are not driven by means of central shafts. The reason for this is that the cartridge, being a master from which tapes are dubbed, carries a heavy one-quarter inch tape and the reels are of large diameter, about four inches. Attempting to drive such reels by means of central shafts at the high speeds encountered raises problems with precise and repeatable mechanical engagement between motors and reels.

A magnetic tape 44 wound in a spool on reel 38, for example, is adapted to pass around a guide roller 46, over a pickup head 48 projecting through opening 30, then between a driven capstan 50 and idler roller 52, and finally around guide roller 54 to the reel 36. Assuming that the capstan 50 is rotating in a clockwise direction and that the idler roller 52 is rotating in a counterclockwise direction, the tape 44 between elements 50 and 52 will be forced to the right as viewed in FIG. 2, thereby causing reel 38 to rotate in a counterclockwise direction while the tape is paid off from reel 38. The speed of the tape passing the pickup head 48 is determined, of course, by the speed of rotation of the capstan 50 driven by a suitable motor 56 mounted below the playing deck 12 shown in FIG. 1. In the usual case, the motor 56 will rotate continuously and is adapted to be connected to the capstan through a magnetic clutch. In order to drive the reel 36 and thus take up the tape passing between elements 50 and 52, it is driven by peripheral engagement with a rubber roller or torque drive 58 mounted on an arm 60 which resiliently urges the roller 58 into engagement with the periphery of reel 36 by means of a spring 62. The roller 58, in turn, is driven by means of motor 64 so as to cause the roller 58 to rotate in a clockwise direction as viewed in FIG. 2.

In order to provide tape tension, the pay-off reel 38 is held back by means of a rubber roller 66 in contact with the periphery of reel 38 and mounted on an arm 68 which urges the roller 66 into engagement with the periphery of reel 38 by means of spring 70. Braking torque is applied to the roller 66 by means of a braking motor 72 or by other suitable means known to those skilled in the art.

As shown in FIG. 1, the rollers 58 and 66, the capstan 50, and the pickup head 48 are all mounted on the playing deck 12 and are external to the cartridge 10; while the rollers 46, 52 and 54 are mounted internally of the cartridge and form integral parts thereof. The upper and lower plates 14 and 16 are provided with guiding strips 74 (FIG. 1) adapted to be received within a cooperating guide slot 76 formed in the tape deck such that the cartridge, when it is inserted onto the tape deck, will automatically become aligned with elements 66, 48, 50 and 58.

The edges of the cartridge casing adjacent the back wall portion 18 are beveled as at 78 and are adapted to be engaged by beveled shoes 80 carried on two spring-loaded solenoids 82 and 84, respectively. A cartridge 10 is loaded onto the playing deck 12 by aligning one of the guide strips 74 with the guide slot 76 and pushing it forwardly until the forward wall portion 24 engages leaf springs 86 and 88 or some other similar resilient mechanism. As the cartridge 10 is pushed against the leaf springs 86 and 88, a point will be reached where a limit switch 90 is tripped. When this occurs, the solenoids 82 and 84, which normally retract the shoes 80, will be automatically energized to force the beveled surfaces of the shoes 80 into engagement with the beveled surfaces 78 on the cartridge 10, thereby forcing the idler roller 52 into engagement with the capstan 50. As shown in FIG. 2, the roller 52 is spring-loaded as schematically indicated at 92 such that it is urged toward the capstan. As the cartridge moves against the force of leaf springs 86 and 88, the spring-loaded rollers 58 and 66 are forced outwardly, in which process the rollers 58 and 66 rotate the reels 36 and 38 in opposite directions slightly so as to produce a taut condition in the tape 44.

In the operation of the invention, the cartridge 10, with one of the guide strips 74 inserted into the guide slot 76, is pushed forwardly and against the force of springs 86 and 88 until limit switch 90 is tripped. At this point, the switch 90, through control unit 94, energizes solenoids 82 and 84, thereby forcing the beveled surfaces of shoes 80 against beveled surfaces 78 on the cartridge. This holds the cartridge in place with the capstan 50 abutting the tape 44 on one side and the idler roller 52 abutting the tape on the other side by virtue of its spring loading 92. In order to begin a dubbing operation, it is necessary that the fully-loaded tape reel be on the left as viewed in FIG. 2. However, should it be on the right, this condition will be sensed by leaf spring 95 which trips limit switch 97 to prevent, through control unit 94, initiation of a dubbing sequence. If, however, the righthand reel is empty and limit switch 97 is not tripped when switch 90 is tripped, a solenoid 103 will be energized through control unit 94 to pivot arm 101 in a clockwise direction, thereby withdrawing the limit switch 97 and leaf spring 95 to the right as shown in FIG. 2. In this respect, note that switch 97 is carried on arm 101, by a U-shaped spring 99. Suitable spring means, not shown, will pivot the arm 101 back into the position shown in FIG. 2 at the completion of a dubbing operation when cartridge 10 is ejected from deck 12.

In order to start a dubbing operation, a start pushbutton 96 is depressed which, through control unit 94, starts the motor 64, engages the magnetic clutch between elements 50 and 56 and causes the motor 72 to apply a braking torque to roller 66. The tape 44, therefore, travels from left to right past the pickup head 48 shown in FIG. 2 and is wound upon reel 36 by virtue of the friction drive provided by roller 58. The roller 66 acts as a hold-back device for reel 38 as explained above.

The tape will travel from reel 38 to reel 36 at speeds as high as 240 inches per second or higher. It will be appreciated that if the end of the tape is reached on reel 38 at these high speeds, it is liable to break. Accordingly, means are provided for sensing the approaching end of the tape and for automatically ejecting the cartridge 10 while braking the reels 36 and 38 at the completion of a dubbing operation. This means includes a photocell 98 which senses the different color or other optical characteristic of a leader or the like at the end of the tape passing by. When the leading edge of the leader is sensed, the photocell, through control unit 94, deenergizes solenoids 82 and 84, and also deenergizes motors 72, 56 and 64. When solenoids 82 and 84 are deenergized, the shoes 80 are forced backwardly by virtue of their spring loading, whereupon the leaf springs 86 and 88 force the cartridge away from the capstan 50. At the same time, and as will be explained hereinafter in greater detail, a reel brake 100 is automatically forced into engagement with the peripheries of the reels 36 and 38, thereby stopping rotation of the same.

During the travel of the tape from reel 38 to reel 36, which may encompass only 30 seconds, the electrical intelligence picked up by pickup head 48 is transmitted to a receiving and recording unit 102 (FIG. 2) containing a cassette which is caused to move at a high speed also. If the program is recorded on tape 44 at 3¾ inches per second (to produce high fidelity in the case of music), and if its speed during dubbing is 240 inches per second, the cassette tape in insert 102 can be caused to move at 120 inches per second for playback at 1⅞ inches per second. It is necessary only that the ratio of the recording or playback speed to the dubbing speed be the same for both units. Hence, the electrical intelligence is transferred to the receiving cassette at an extremely high speed. However, on playback, the cassette at the receiving unit 102, or in a remote playback unit, is rotated at a much lower speed. If one were to attempt to listen, via a microphone or loud-speaker, to the signal derived from pickup head 48 at the high dubbing speed, he would simply hear a screech or squeal. However, after this is once recorded onto a receiving cassette at high speed, it can be played back at the normal, lower speed and the intelligence recognized.

Figure 3:
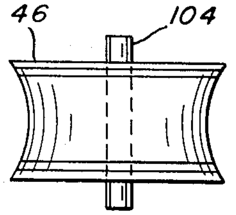
FIG. 3 is a plan view of the tape guide rollers utilized in the cartridge of FIG. 2.

As was explained above, the guide rollers 46 and 54 are of the hourglass type and generally concave in configuration as shown by roller 46, for example, in FIG. 3. It rotates about a pin 104 extending between the upper and lower plates 14 and 16. The concave or hourglass configuration of the roller 46, as well as that of roller 54, acts to automatically center the tape and prevent sideways movement at the extremely high speeds employed as is more fully described in copending application Ser. No. 254,691, filed May 18, 1972.

Figure 4:
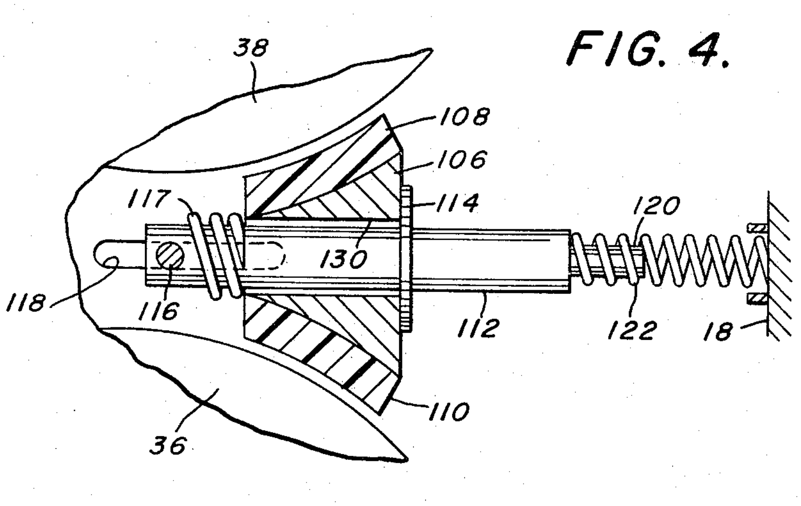
FIG. 4 is a top view, partially in cross section, of the reel brake of the invention.

The details of the reel brake 100 are shown in FIG. 4. It consists of a central body 106 having curved friction liners 108 and 110 on its opposite surfaces. As an alternative, the body 106 could be made entirely of frictional material, thus doing away with separate liners 108 and 110. The body 106 is carried on a plunger 112. A snap ring 114 limits the relative movement between the body 106 and the plunger 112 in one direction. A pin 116 and coil spring 117 limit the movement of the body 106 in the opposite direction. The pin 116 extends upwardly and downwardly through slots 118 in the guide strips 74 as is perhaps best shown in FIG. 1. The end of the plunger 112 opposite the pin 116 has a reduced diameter portion 120 encircled by a coil spring 122 which abuts against the back wall portion 18 of the cartridge 10. Under the influence of spring 122, the body 106 will be forced to the left as shown in FIG. 4, forcing the friction liners 108 and 110 into contact with the peripheries of the reels 36 and 38.

Reverting again to FIG. 1, it will be noted that a groove 124 is formed in the slot 76 and terminates at point 126. When the cartridge is inserted into place on the playing deck 12, the pin 116 which projects both above and below the respective guiding strips 74, will enter the groove 124. At this precise time, the friction liners 108 and 110 will be in engagement with the reels 36 and 38. However, as the cartridge 10 is pushed forwardly, the pin 116 will engage the stop point 126; whereupon continued movement of the cartridge 10 forwardly will force the plunger 112 together with the body 106 and the friction liners backwardly, thereby releasing the reels 36 and 38 for rotation. Of course, at the completion of a playing operation and upon backward movement of the cartridge 10, the force of spring 122 will immediately engage the brake with the reels 36 and 38, thereby stopping them. The pin 116, in addition to disengaging the brake, serves an additional important function in that it permits pivotal movement of the brake about the pin. It has been found that the braking forces on the reel perimeters are not the same for both reels. Consequently, there is a tendency of "shuttling" of the brake shoe between reels. Thus, if the brake shoe were to move backwardly and forwardly only, without permitting pivotal movement about the pin 116, uneven braking forces would be exerted on the two reels. Note also, that the central opening 130 in the body 106 is oversized, thereby permitting a certain amount of play between the body and the plunger 112. The weak spring 117 causes the body to be biased toward the snap ring 114, however allowing the aforementioned pivotal movement. By virtue of the pivotal connection about pin 116 within slot 118, and the play permitted by the oversized opening 130, the brake may move sideways over a limited range to insure simultaneous engagement of the liners 108 and 110 with the peripheries of the tape reels. Thus, the body 106 and its associated liners can move sideways over a limited range. It can be shown that it is then not important whether the liners contact the right-hand or left-hand reel first. Due to differential actions, the brake shoe shown in FIG. 4 will quickly shuttle back and forth so that for all practical purposes, both reels are contacted simultaneously regardless of how much misalignment there may be between reels and brake shoe.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A magnetic tape cartridge and playing deck assembly comprising a casing, a pair of spaced reels within the casing, a plurality of tape guides within the casing, a magnetic tape extending from one of said reels around said guides to the other of said reels, opening in the front side wall of said casing for receiving a magnetic head across which the tape will pass, a first roller which engages one side of the tape, a second roller within the casing against which said first roller is pressed with the tape therebetween, a guide slot in said deck, guide strips on opposite sides of said cartridge adapted to be received within said guide slot, a reel brake for said reels, said reel brake comprising a reciprocative body intermediate the reels and having arcuate friction liners on its opposite sides for engagement with the peripheries of said reels, a pin carried on said body and projecting through the top and bottom of said cartridge and said guide strips, and a groove within said guide slot, the groove terminating at a point whereby the pin will engage the end of the groove and disengage the reel brake from said reels when the second roller and tape are pressed against said first roller.

2. The assembly of claim 16 wherein said body is loosely mounted on a plunger connected at one end to said pin, spring means interposed between said pin and said body, and spring means interposed between the end of said plunger and a wall portion of said casing.

* * * * *